(12) United States Patent
Smith et al.

(10) Patent No.: US 9,400,744 B2
(45) Date of Patent: Jul. 26, 2016

(54) MAGNETIC RANDOM ACCESS MEMORY JOURNAL FOR MULTI-LEVEL CELL FLASH MEMORY

(71) Applicant: Mangstor, Inc., Austin, TX (US)

(72) Inventors: Trevor Smith, Austin, TX (US); Ashwin Kamath, Cedar Park, TX (US)

(73) Assignee: MANGSTOR, INC., Austin, TX (US)

( * ) Notice: Subject to any disclaimer, the term of this patent is extended or adjusted under 35 U.S.C. 154(b) by 220 days.

(21) Appl. No.: 14/065,589

(22) Filed: Oct. 29, 2013

(65) Prior Publication Data
US 2014/0122779 A1    May 1, 2014

Related U.S. Application Data

(60) Provisional application No. 61/719,986, filed on Oct. 30, 2012, provisional application No. 61/719,994, filed on Oct. 30, 2012, provisional application No. 61/720,000, filed on Oct. 30, 2012.

(51) Int. Cl.
| *G11C 7/00* | (2006.01) |
| *G06F 12/02* | (2006.01) |
| *G06F 11/14* | (2006.01) |
| *G06F 13/00* | (2006.01) |
| *G06F 12/08* | (2016.01) |

(52) U.S. Cl.
CPC ........ *G06F 12/0246* (2013.01); *G06F 11/1441* (2013.01); *G06F 12/0866* (2013.01); *G06F 12/0804* (2013.01)

(58) Field of Classification Search
CPC ............ G11C 7/00; G06F 13/00; G06F 11/00
USPC ............................ 365/190; 711/104; 714/746
See application file for complete search history.

(56) References Cited

U.S. PATENT DOCUMENTS

| 7,554,859 | B2 * | 6/2009 | Choi ...................... 365/189.05 |
| 8,677,217 | B2 * | 3/2014 | Takeuchi et al. ............. 714/764 |
| 2002/0051394 | A1 * | 5/2002 | Tobita et al. ................. 365/221 |
| 2006/0023524 | A1 * | 2/2006 | Konishi ...................... 365/200 |
| 2006/0282665 | A1 | 12/2006 | Zhu et al. |
| 2007/0260891 | A1 | 11/2007 | Starr et al. |
| 2008/0022163 | A1 * | 1/2008 | Tanaka et al. ................ 714/710 |
| 2008/0082834 | A1 | 4/2008 | Mattsson |
| 2010/0027783 | A1 | 2/2010 | Yup |
| 2011/0072199 | A1 | 3/2011 | Reiter et al. |
| 2012/0278635 | A1 | 11/2012 | Hars et al. |
| 2013/0124784 | A1 * | 5/2013 | Woo et al. ..................... 711/103 |
| 2014/0047164 | A1 * | 2/2014 | Nemazie ....................... 711/103 |

* cited by examiner

*Primary Examiner* — Christopher Shin
(74) *Attorney, Agent, or Firm* — Andrews Kurth LLP; Sean S. Wooden

(57) ABSTRACT

A flash memory system comprises a logic block interface operable to receive a write command from a host computer, the write command specifying data and a write destination address in a flash memory device, the flash memory device operable to store data at a complementary address corresponding to the specified write destination address. The system further comprises a journal communicatively coupled to the flash memory device and the logic block interface operable to temporarily store data from the complementary address of the flash memory device, and to provide the stored data in the journal to be restored to the flash memory device at the complementary address in the event of an error occurring while executing the write command.

14 Claims, 2 Drawing Sheets

MAGNETIC RANDOM ACCESS MEMORY JOURNAL FOR MULTI-LEVEL CELL FLASH MEMORY

RELATED APPLICATION

The present application claims the benefit of U.S. Provisional Patent Applications Nos. 61/719,986; 61/719,994; and 61/720,000, all filed on Oct. 30, 2012, which are incorporated herein by reference.

FIELD

The present disclosure relates to data storage devices, and in particular to using a Magnetic Random Access Memory (MRAM) journal for a Multi-Level Cell (MLC) flash memory device.

BACKGROUND

Flash memory devices have been recognized as an attractive non-volatile data storage option for mobile computers and smartphone devices because of their small size, lightweight, shock resistance, fast access speed, and low power consumption. It is anticipated that with further advances in flash memory technology, its popularity may rival or even outpace hard disks. However, due to the different construction of flash memory as compared with a hard disk device, there are special considerations that have to be addressed in order to take advantage of the flash memory device.

Multi-Level Cell (MLC) NAND-based flash memory devices are constructed of memory elements that are capable of storing more than one bit of information per cell. MLC technology uses multiple levels per cell to allow more than one bit to be stored using the same number of transistors. In a typical MLC NAND flash memory, each cell can store two bits of information with four possible states. The two bits of a single cell are assigned to two different pages, commonly referred to as the MSB (most significant bit) page and the LSB (least significant bit) page.

In a flash memory device, a write operation is preceded by an erase operation, which takes much longer than the write operation itself. Further, the smallest addressable unit for read and write operations in a flash memory is a page, but the smallest erasable unit is a block. This means that to even write a single byte of data into a flash memory requires the erase and restoration of a block of data. In the unexpected event of power loss after the data is erased but before the data is restored and written into the flash memory, data would be lost if no precaution has been taken to address this issue. For MLC flash memory devices, a write to one page, either the MSB or LSB page, data in the other corresponding page would become corrupted if an event such as power failure occurs while the write operation is in progress.

In some conventional flash memory devices, capacitive devices have been used to keep supplying power to the flash memory so that the write operation may be completed. Such implementations not only have large component costs, but may be inadequate as the completion time for the write operation is unpredictable. The power in the capacitive device may still be insufficient to complete the write.

SUMMARY

A flash memory system comprises a logic block interface operable to receive a write command from a host computer, the write command specifying data and a write destination address in a flash memory device, the flash memory device operable to store data at a complementary address corresponding to the specified write destination address. The system further comprises a journal communicatively coupled to the flash memory device and the logic block interface operable to temporarily store data from the complementary address of the flash memory device, and to provide the stored data in the journal to be restored to the flash memory device at the complementary address in the event of an error occurring while executing the write command.

A flash memory system comprises a logic block interface operable to receive a write page A command from a host computer, a flash device operable to store data in a page B corresponding to page A. and a journal communicatively coupled to the flash device and logic block interface operable to temporarily store data from page B of the flash device, and to provide the data from page B to be restored to the flash device in response to a write page A error.

A method for use with a MLC flash memory comprises receiving a write page A command, reading data from a page B complementary to page A from a flash memory device, writing the data from page B to a journal, successfully writing to page A of the flash memory device, and retiring, in the journal, data from page B of the flash memory device.

A computer-readable medium having encoded thereon a method comprises receiving a write page A command from a host computer, reading data from a page B corresponding to page A from a flash memory device, storing the data from page B to a Magnetic Random Access Memory journal, writing to page A of the memory device, retiring, in the Magnetic Random Access Memory journal, data from page B of the memory device in response to a successful write to page A, and reading the data from page B from the Magnetic Random Access Memory journal and restoring the page B data to the memory device in response to an error in writing to page A.

DETAILED DESCRIPTION

Multi-Level Cell (MLC) NAND-based flash memory devices are constructed of memory elements that are each capable of storing more than a single bit of information. MLC technology uses cells that have multiple levels to allow more than one bit of data to be stored per cell. In a typical MLC NAND flash memory, each cell can store two bits of data with total of four possible states. The two bits of a single cell are assigned to two different pages, the MSB page and the LSB page.

In a flash memory device, a write operation has to be preceded by an erase operation, which typically takes much longer than the write operation itself. Further, the smallest addressable unit for read and write operations is a page, but the smallest erasable unit is a block. This means that to even write a single byte of data into a flash memory requires the erase and restoration of a block of data. In the unexpected event of power loss after the data is erased but before the data is restored and written into the flash memory, data would be lost if no precaution has been taken to address this issue. For MLC flash memory devices, a write to one page, either the MSB or LSB page, data in the other corresponding or complementary page would become corrupted if an event such as power failure occurs while the write operation is in progress.

Figure 1:
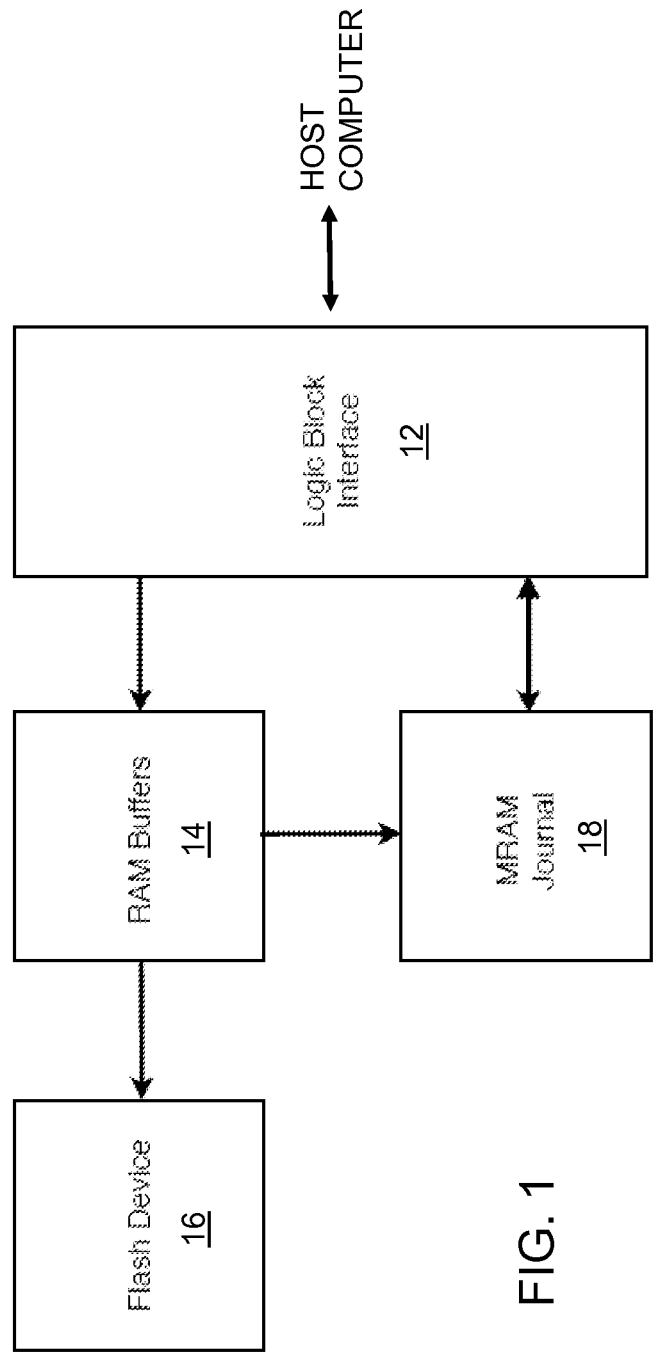
FIG. 1 is a simplified block diagram of an exemplary embodiment of a flash memory device according to the present disclosure.

FIG. 1 is a simplified block diagram of an exemplary embodiment of a flash memory device 10 according to the present disclosure. The flash memory device 10 includes a logic block interface 12 that serves as an interface to a host computer or host device (not shown). The logic block interface 12 may include Flash Translation Layer (FTL) functionality to provide a translation between the logical block addresses used in the read and write commands issued by the host computer, and the physical block or page addresses in a flash memory device 16. RAM (Random Access Memory) buffers 14 are communicatively coupled between the logic block interface 12 and the flash memory device 16. The RAM buffers 14 are used to buffer or temporarily hold data to be written to the flash device 16 as well as the translated physical address of the location for the write operation. A MRAM (Magnetic Random Access Memory) journal 18 is further communicatively coupled with the logical block interface 12 and the RAM buffers 14. The MRAM technology is a non-volatile memory device that does not rely on a power source to retain the stored data, and can maintain the data nearly permanently.

Figure 2:
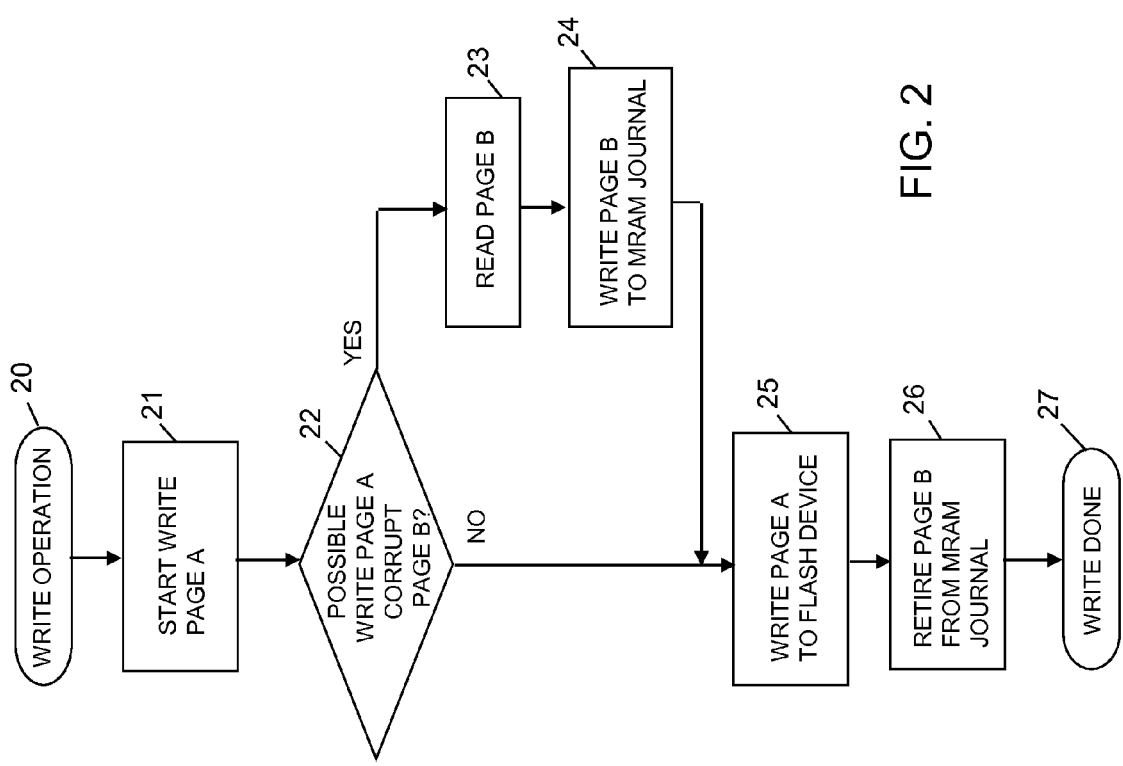
FIG. 2 is a simplified flowchart of an exemplary embodiment of a flash memory boot procedure according to the present disclosure.

FIG. 2 is a simplified flowchart of an exemplary embodiment of a flash memory write procedure 20 according to the present disclosure. In this flowchart, the term page A is used to refer to the page to which new data are to be written, and it may be either the MSB (most significant bit) page or the LSB (least significant bit) page. Similarly, the term page B is used to refer to the other corresponding or complementary page of page A.

In block 21, a data write operation to page A begins. This may include, for example, receiving a write data command from the host computer, which may include a logical address and the data to be written. A translation is typically made between the logical address and the physical location, and the data and the translated address are buffered in the buffers 14.

In block 22, a determination is made as to whether the write operation, if interrupted or disrupted, may corrupt the data already stored in page B, the other corresponding page. If the answer is yes, then in blocks 23 and 24, the data in page B are read from the flash memory device 16 and written to the MRAM journal 18. The MRAM journal 18 thus temporarily holds the data in page B that may become corrupted if the write operation to page A encounters an error or power loss, for example. In block 25, the data are then written to page A. If the write to page A is successfully completed, then in block 26 the data from page B that have been stored in the MRAM journal 18 are "retired," which allows the page B data in the MRAM journal to be erased or written over. The write process ends in block 27.

In the event of a write failure or power loss during the write operation to page A, upon power up or boot, the MRAM journal 18 is accessed to fetch the page B data and used to restore the page B data back to the flash memory device 16.

It should be noted that the MRAM journal 18 may be used to store all information needed to restore the page B data back to the flash memory device 16. For example, the MRAM journal 18 may store the address location in the flash memory device where the page B data should be restored.

According to the embodiments described herein, the MRAM journal 18 may be used to temporarily preserve the data in the companion page of the page being written to in an MLC flash memory device. In the event of certain disruptive events, such as power loss, an incomplete write operation causes data loss in the RAM buffers 14, as well as corrupt the data already stored in the companion page.

It should be noted although the present disclosure focuses on NAND type flash memory technology, the concepts described and claimed herein are equally applicable to other types of memory technology. Further, although the disclosure emphasized writing data to pages, it should be understood that the write operation may be executed on a group or range of address locations.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A flash memory system comprising:
  a logic block interface operable to receive a write command from a host computer, the write command specifying data and a write destination address in a flash memory device;
  the flash memory device operable to store data at a complementary address corresponding to the specified write destination address; and
  a journal communicatively coupled to the flash memory device and the logic block interface operable to temporarily store data from the complementary address of the flash memory device, and to provide the stored data in the journal to be restored to the flash memory device at the complementary address in the event of an error occurring while executing the write command.

2. The flash memory system of claim 1, wherein the journal comprises Magnetic Random Access Memory technology.

3. The flash memory system of claim 1, further comprising a buffer communicatively coupled to the logic block interface and flash memory device, and operable to buffer the data to be written to the flash memory device.

4. The flash memory system of claim 1, wherein the logic block interface is operable to translate between the write destination addresses in the write command issued by the host computer and one or more physical addresses in the flash memory device.

5. The flash memory system of claim 1, wherein the flash memory device comprises Multi-Level Cell flash memory technology.

6. The flash memory system of claim 1, wherein:
  the write destination address comprises a page A of the flash memory device;
  the complementary address comprises a page B of the flash memory device; and
  the journal is operable to temporarily store data from the page B of the flash device, and to provide the stored data from the page B to be restored in the event of the error.

7. The flash memory system of claim 6, wherein the journal comprises Magnetic Random Access Memory technology.

8. The flash memory system of claim 6, wherein the flash device comprises Multi-Level Cell flash memory technology.

9. A method for use with a MLC flash memory, comprising:
  receiving a write page A command;
  reading data from a page B complementary to page A from a flash memory device;
  writing the data from the page B to a journal;
  successfully writing to the page A of the flash memory device; and retiring, in the journal, the stored data from the page B of the flash memory device.

10. The method of claim 9, wherein the journal comprises a Magnetic Random Access Memory.

11. The method of claim 9, further comprising: in response to an error in writing to page A, reading the data from the page B stored in the journal and restoring the data read from the journal to the flash memory device.

12. The method of claim 9, further comprising buffering data to be written to page A in a buffer.

13. The method of claim 9, wherein the write page A command comprises one or more logical block addresses, and further comprising translating between the logical block addresses and one or more physical addresses in the flash memory device.

14. A non-transitory, computer-readable medium having encoded thereon a method comprising:
  receiving a write page A command;
  reading data from a page B complementary to page A from a MLC flash memory device;
  writing the data from the page B to a journal;
  successfully writing to the page A of the MLC flash memory device; and
  retiring, in the journal, the stored data from the page B of the MLC flash memory device.

\* \* \* \* \*